United States Patent [19]
Brown

[11] Patent Number: 5,268,899
[45] Date of Patent: Dec. 7, 1993

[54] APPARATUS FOR GENERATING PSEUDO-RANDOM NUMBERS IN A COMMUNICATION SYSTEM, OR OTHER SYSTEM INVOLVING A SHARED RESOURCE

[75] Inventor: David R. Brown, San Jose, Calif.

[73] Assignee: 3Com Corporation, Santa Clara, Calif.

[21] Appl. No.: 778,564

[22] Filed: Oct. 17, 1991

[51] Int. Cl.[5] .................................. H04L 12/40
[52] U.S. Cl. .................................. 370/85.3; 364/717
[58] Field of Search .................... 370/85.1, 85.2, 85.3;
364/717; 331/78; 377/46, 54, 81; 328/59, 62;
307/260, 271, 480; 371/27; 340/825.5

[56] References Cited

U.S. PATENT DOCUMENTS

| | | | |
|---|---|---|---|
| 4,536,875 | 8/1985 | Kume et al. | 370/85.3 |
| 4,598,285 | 7/1986 | Hoshen | 370/85.2 |
| 4,641,102 | 2/1987 | Coulthart et al. | 328/62 |
| 4,644,348 | 2/1987 | Gerety | 340/825.5 |
| 5,117,380 | 5/1992 | Tanagawa | 364/717 |

OTHER PUBLICATIONS

Local Area Networks, Intel Model 82586.
Network Interface Controller, National Semiconductor Model 8390.

Primary Examiner—Douglas W. Olms
Assistant Examiner—Hassan Kizou
Attorney, Agent, or Firm—Fliesler, Dubb, Meyer & Lovejoy

[57] ABSTRACT

A pseudo-random number generator for a communications network, such as a CSMA/CD network, is based on a circuit which supplies a pseudo-random signal which normally changes according to a first algorithm, and changes according to a second algorithm during intervals having duty cycle behavior known to vary from node to node, such as transmission times of the node. Because it is very unlikely that two nodes in a given network will have transmission times that are equal, it is unlikely that pseudo-random number generators responsive to the local transmission times will proceed in lock-step. The pseudo-random number generator comprises, for instance, a counter which runs at a first clock rate normally, and runs at a second clock rate during intervals having lengths determined by the transmission times of the node.

34 Claims, 3 Drawing Sheets

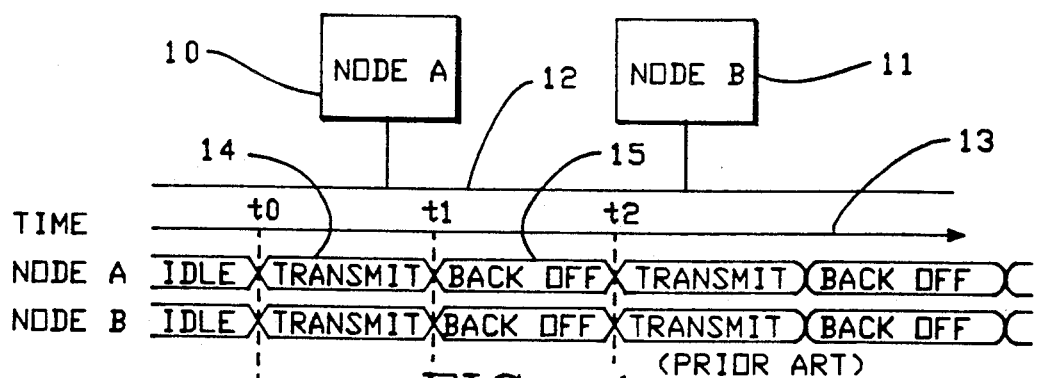

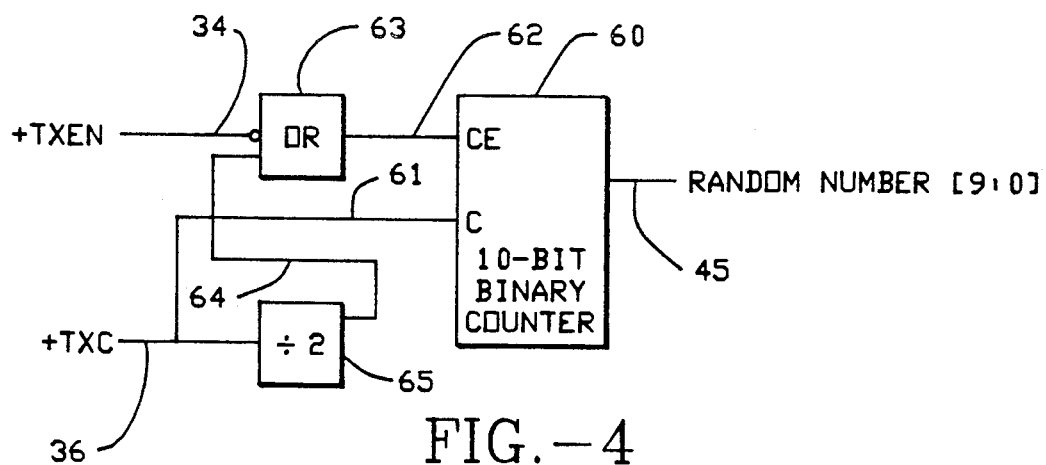
FIG.—4
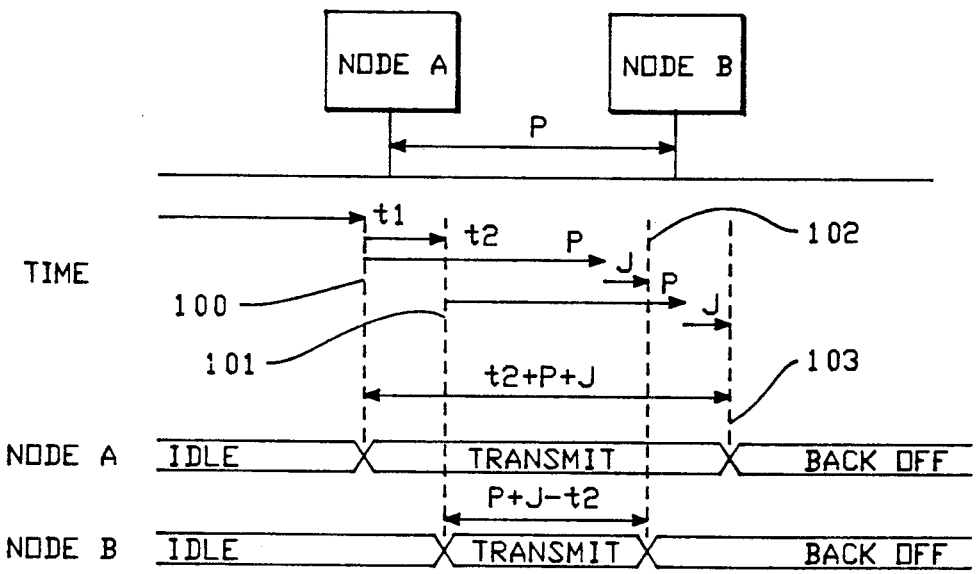
FIG.—5
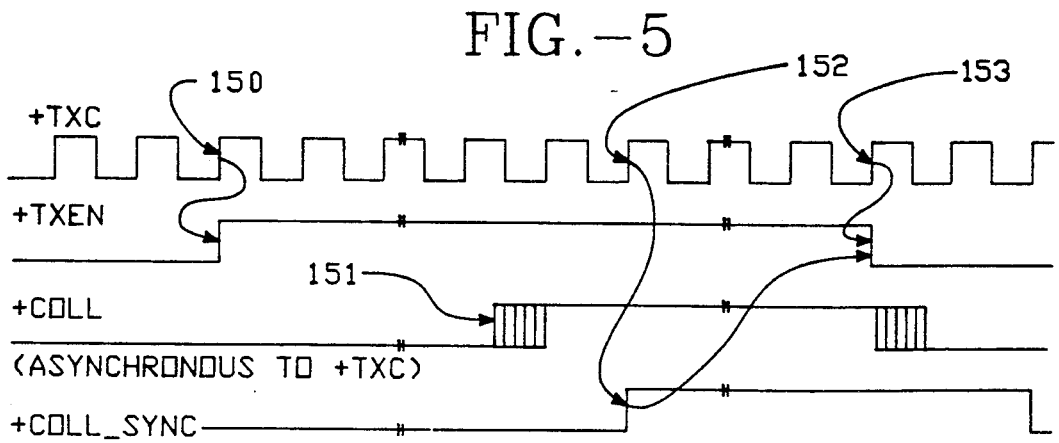
FIG.—6

APPARATUS FOR GENERATING PSEUDO-RANDOM NUMBERS IN A COMMUNICATION SYSTEM, OR OTHER SYSTEM INVOLVING A SHARED RESOURCE

BACKGROUND OF THE INVENTION

1. Field of the Invention

The present invention relates to the generation of pseudo-random numbers used in controlling nodes of communications systems or other systems involving shared resources; and particularly to determine the length of backoff intervals in CSMA/CD networks.

2. Description of Related Art

Network nodes in a CSMA/CD (Carrier Sense Multiple Access with Collision Detection) system, such as 802.3 CSMA/CD systems ("Ethernet"), are required to generate pseudo-random numbers as part of the collision recovery process. Simply put, when two or more nodes collide, they each generate a pseudo-random number which determines the integral number of slot-times that the node will wait (backoff) before attempting to retransmit. If two nodes generate the same number, they will retransmit at the same time, causing another collision, pseudo-random number generation, and backoff.

Theoretically, the nodes will eventually generate distinct numbers and one of the nodes (the one with the lower pseudo-random number) will be able to transmit successfully. The 802.3 specification places an upper limit of 16 attempts on a transmission before it is aborted. From a channel utilization standpoint, is desirable that the two nodes generate distinct numbers in as few attempts as possible.

There are a number of methods that allow a single node to generate pseudo-random numbers through time. However, it has proven more difficult to arrive at a solution that, when duplicated within several nodes on a network, will allow those nodes to generate pseudo-random numbers independently of one another. This is necessary to avoid having two nodes backoff in look-step.

Consider the case of two identical nodes on a network, as shown in FIG. 1. Node A 10 and node B are two adjacent nodes on a network 12. For the sake of simplicity, we will assume that there is zero node-to-node propagation delay.

Both nodes are initialized and begin operating at time zero as indicated along trace 13. At time $t_0$ they start transmitting 14, they both detect that a collision is occurring at time $t_1$, and each generates a pseudo-random number to determine the backoff interval. Since both nodes A and B were initialized at the same time, and they detected a collision at the same time, they could produce the same pseudo-random number, causing another collision at time $t_2$ after the backoff interval 15. This could continue through all 16 attempts in an 802.3 network until the transmissions are aborted.

The problem can be generalized as this: given two nodes in a network whose pseudo-random number generators are operating in lock-step, an algorithm must be chosen to force the two nodes to diverge and produce distinct numbers.

Several companies have implemented integrated 802.3 controllers. They each have had to deal with the pseudo-random number generation problem.

The Intel 82586 and National Semiconductor 8390 are representative. In the 82586, a cyclic redundancy code CRC generated from the last frame transmission is used as the pseudo-random number. There is a substantial chance that two nodes could generate the same CRC value from different transmitted frames. However, as two nodes repeatedly collide, the chance that they would repeatedly generate the same CRC gets progressively smaller.

In the 8390, National has implemented a free-running oscillator which is sampled with the 10 MHz network clock. The sampled bits are assembled, probably by shifting them into a shift register, to form the required width for use by the backoff algorithm. There is a significant probability that a specific collision will cause two nodes to "roll" the same number, but as in the Intel case, this probability becomes increasingly small over repeated collisions.

An early version of the Intel 82586 used a pseudo-random number generation algorithm based on a free-running 10-bit counter, operating off the 10 MHz network clock. This method was abandoned because multiple nodes on a network could have their counters in synchronism, causing repeated collisions.

Accordingly, it is desirable to provide a pseudo-random number generator for use in controlling nodes of a communication network that minimizes the possibility of having pseudo-random number generators at two nodes in the network operating in lock-step. This is particularly important in high traffic CSMA/CD networks, such as the 802.3 standard.

SUMMARY OF THE INVENTION

The present invention provides a pseudo-random number generator for a communications network, based on a circuit which supplies an output signal indicating the pseudo-random number which normally changes according to a first algorithm, and changes according to a second algorithm during intervals having lengths corresponding to transmission times of the node, or other conditions of the node expected to exhibit different duty cycles from node to node. Because it is very unlikely that two nodes in a given network will have transmission times that are equal, the likelihood that a pseudo-random number generated in response to the transmission times will proceed in lock-step is very low.

Thus, according to one aspect of the invention, the pseudo-random number generator comprises a counter, shift register or other logic which runs at a first clock rate normally, and runs at a second clock rate during intervals having lengths determined by the transmission times of the node. Thus, even if all of the pseudo-random number generators on a given network normally run at the same first clock rate, and normally run at the same second clock rate during intervals having lengths determined by transmission times of their respective nodes, it is very unlikely that these counters (or other logic) will run in lock-step because the transmission times of the various nodes will most likely be unequal.

According to another aspect, the present invention provides a node connected to a network medium of a communications network. The network includes a transmitter, collision detection logic, and logic for disabling the transmitter for a backoff interval during detection of a collision. Logic for determining the length of the backoff interval includes a circuit for generating a backoff interval length signal, which changes normally according to a first algorithm, and changes according to a second algorithm during intervals determined by transmission times of the transmitter.

According to another aspect of the present invention, an interface between a data processor and a communication medium for a CSMA/CD network is provided. The interface includes a transmitter responsive to a transmit enable signal and a transmit clock for transmitting signals on the communication medium. Collision detection logic generates a collision signal in response to collisions on the communications medium between the transmitter and other sources of signals using the communications medium. Control logic receives requests to transmit frames of data from the data processor and receives the collision signal. The control logic generates the transmit enable signal according to such control parameters as are common in the art. The transmit enable signal is further deasserted for a backoff interval in response to the collision signal. A circuit for generating a pseudo-random signal is coupled with the control logic and responsive to the transmit clock. This circuit generates the pseudo-random signal according to a first algorithm normally, and according to a second algorithm during intervals determined by transmission times of the transmitter. Transmission times of the transmitter are indicated by the transmit enable signal.

In one aspect of the invention, the pseudo-random number generator comprises a counter which has a clock input receiving the transmit clock and an enable input. The output of the counter changes in response to the transmit clock during assertion of a counter enable signal supplied to its enable input. A circuit for supplying the counter enable signal is responsive to the transmit enable signal to modulate the counter enable signal during assertion of the transmit enable signal. This results in the counter output changing at a second clock rate during assertion of the transmit enable signal.

The pseudo-random number generator according to the present invention, can be beneficially used in CSMA/CD networks, which control access to the transmission medium using the backoff technique described above. Further, the pseudo-random number generator can be used in other kinds of systems where a plurality of nodes are competing for access to a common resource.

It is found that the present invention provides a pseudo-random number generator which can be used in controlling nodes in a network that is very unlikely to operate in lock-step. This improves performance of communications systems by reducing the number of collisions on the communications medium.

Other aspects and advantages of the present invention can be seen upon review of the figures, the detailed description, and the claims which follow.

BRIEF DESCRIPTION OF THE FIGURES

FIG. 1 is a diagram heuristically illustrating one problem encountered in prior art CSMA/CD networks.

FIG. 2 is a block diagram of a communications interface in a network node according to the present invention.

FIG. 3 is a timing diagram illustrating operation of the interface of FIG. 2.

FIG. 4 is a schematic diagram of a pseudo-random number generator according to a preferred embodiment of the present invention.

FIG. 5 is a heuristic diagram illustrating a theory of operation for the present invention.

FIG. 6 is a timing diagram illustrating one reason that it is unlikely for the transmit enable signal TXEN on two separate nodes to be asserted for the same length of time during a collision episode.

DETAILED DESCRIPTION

Figure 7:
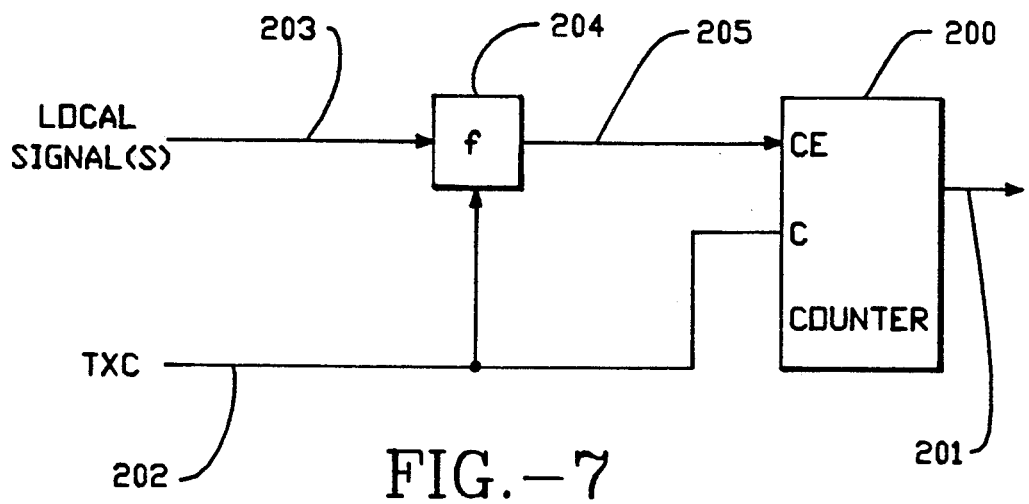
FIGS. 7–9 provide alternative embodiments of the pseudo-random number generator according to the present invention.

A detailed description of preferred embodiments of the present invention is provided with reference to FIGS. 2–9.

FIG. 2 provides a schematic diagram of an interface in a CSMA/CD network, such as the 802.3 standard. The circuit of FIG. 2 provides an interface between a data processor which generates signals indicating a request to transmit a frame (transmitAFrame on line 30) on a communication medium 51. A transmitter 32 is coupled to the communications medium 51 to transmit data from the data processor, across connections not shown to simplify the diagram. The interface includes collision detection logic 31, which is coupled to the communications medium 51 and detects collisions between the local transmitter 32 and other sources of signals on the medium 51. Transmit control logic 33 receives the transmitAFrame signal on line 30 and generates a transmit enable signal $\psi$TXEN across line 34 according to parameters as known in the art. The transmitter 32 is responsive to the transmit enable signal TXEN to transmit data while the transmit enable signal TXEN on line 34 is asserted. The transmitter 32 is disabled when the transmit enable signal TXEN on line 34 is deasserted. Thus, the TXEN signal indicates times of use, including uses which collide with other nodes, by the node of the communication medium.

A clock 35 generates a transmit clock signal TXC on line 36 which is propagated to the transmit control logic 33.

For CSMA/CD networks, the interface includes backoff interval control 37. The backoff interval control 37 includes backoff control logic 38, a backoff timer 39, and a pseudo-random number generator 40. The backoff control logic receives as input a transmit request signal transmitReq on line 41 from the transmit control 33, a collision signal COLL on line 42 from the collision detect logic 31, the transmit enable signal TXEN on line 34, and the transmit clock TXC on line 36. The backoff control logic 38 supplies a startBackoff signal on line 43 to the backoff timer 39 and receives an endBackoff signal on line 44 from the backoff timer 39. The backoff timer receives as input the transmit clock TXC on line 36. The backoff timer 39 samples a pseudo-random number across line 45 from a pseudo-random number generator 40. The pseudo-random number generator 40 receives as input the transmit enable signal TXEN on line 34 and the transmit clock TXC on line 36.

FIG. 3 is a timing diagram illustrating operation of the interface circuit of FIG. 2. As illustrated, a transmitAFrame signal 30 may be received by the transmit control logic 33 at time $t_1$. In response, a transmit request signal transmitReq 41 is generated for supply to the backoff control logic 38. If the interface is not in a backoff interval, then the backoff control logic 38 immediately returns the transmitGrant signal 47. Transmit control 33 then generates the transmit enable signal TXEN on line 34 and the transmitter 32 is enabled to transmit. At time $t_2$, a collision on the transmission medium 51 may be detected by the collision detect logic 31.

In response to the collision signal on line 42, the backoff control logic 38 generates a transmit abort signal transmitAbort 48. The transmit control logic 33 in response to the transmitAbort deasserts transmit enable TXEN on line 34 at time $t_3$. Then the backoff control logic 38 in response thereto generates a startBackoff signal on line 43.

Also in response to the transmitAbort, the transmit control logic 33 sends a frameCollided signal 49 to the data processor in the upper layer of logic. Later, the data processor will reassert the transmitAFrame signal 30 at time $t_4$.

In response to the second transmitAFrame signal at time $t_4$, the transmit control logic will assert the transmitReq signal, but transmitGrant will not be asserted until the backoff interval has expired. The backoff timer 39 will generate an endBackoff signal at time $t_5$ after the expiration backoff interval. After endBackoff, the backoff control logic 38 generates a transmitGrant and transmit control 33 reasserts transmit enable TXEN. As discussed above, because the pseudo-random number generator operates in a first mode when the transmit enable signal TXEN is deasserted and in a second mode when the transmit enable signal TXEN is asserted, it is highly unlikely that the backoff period in two nodes suffering a collision will be equal.

It would be appreciated by those skilled in the art that the transmit enable signal TXEN is but one method of indicating transmission time of the interface. Other logic could be utilized to control the mode of operation of the pseudo-random number generator 40 so that it operates according to a first algorithm normally, and according to a second algorithm during intervals of time having lengths that are a function of the transmission time of the transmitter 32. For instance, in systems using the Intel 82586 interface controller, the request-to-send signal RTS, could be used as an indicator of transmit time. Also, as discussed below, conditions other than transmission times expected to exhibit different duty cycle behaviors from node to node could be used to control the pseudo-random number generator.

FIG. 4 illustrates a preferred embodiment of the pseudo-random number generator utilized in the circuit of FIG. 2. As can be seen, the pseudo-random number generator includes a 10 bit binary counter 60. The counter 60 includes a clock input 61 and a counter enable input 62. The clock input 61 is coupled to the transmit clock TXC on line 36. The counter enable signal at input 62 is supplied at the output of OR gate 63. The inputs to the OR gate 63 include the output on line 64 of a divide-by-two circuit 65. The input of the divide-by-two circuit 65 is the transmit clock TXC on line 36. The division of the transmit clock can be by any value other than one. The value, two, was chosen because it can be simply implemented using a D-type flip-flop connected with feedback, as known in the art.

The second input, which is active low, to the OR gate 63 is the transmit enable signal TXEN on line 34. Thus, the counter enable signal 62 is always asserted when transmit enable TXEN on line 34 is deasserted, or low. When transmit enable TXEN goes active, indicating transmission by the transmitter, the counter enable signal on line 62 is modulated by the signal on line 64. This results in the output of the counter 60 advancing at the transmit clock rate normally, and at half the transmit clock rate during transmission times of the node.

It would be appreciated by those skilled in the art that this is just one example of a pseudo-random number generator having two modes, where in a first mode the pseudo-random output changes according to a first algorithm, and in a second mode the pseudo-random output changes according to a second algorithm. Some generalized embodiments are described below with reference to FIGS. 7, 8, and 9.

A description of the relative transmission times for colliding nodes utilizing this technique is provided with reference to FIG. 5. As mentioned above, the circuit of FIG. 4 is a preferred system for a standard 802.3 network. When the transmitter is idle, the 10-bit counter 60 runs at the rate of the transmit clock, +TXC. However, while the transmitter is transmitting data onto the network (as indicated by an active level on transmit enable TXEN, the counter 60 counts at a rate of +TXC/2. Consider a two-node network as shown in FIG. 5, in which the propagation delay between the nodes is p. At time $t_1$ (marker 100), node A begins to transmit a frame. Node B begins to transmit before it receives the transmission from node A, $t_2$ time units after node A begins transmission (marker 101) ($t_2 < p$). Node A's signal reaches node B at time ($t_1 + p$). Node B detects the collision, jams the network for time j to ensure that the collision is detected at the colliding node A, and stops transmitting at time ($t_1 + p + j$) (marker 102). Meanwhile, node B's signal reaches node A at time ($t_1 + t_2 + p$). Node A also detects the collision, jams, and ends transmission at ($t_1 + t_2 + p + j$) (marker 103).

From the above, the transmission times for the two nodes can be derived:

$$T_{Node\ A} = (t_1 + t_2 + p + j) - t_1 = t_2 + p + j$$

$$T_{Node\ B} = (t_1 + p + j) - (t_1 + t_2) = p + j - t_2$$

The difference in transmission time between the two nodes is:

$$T_{diff} = (t_2 + p + j) - (p + j - t_2) = 2t_2$$

So, when two nodes collide, the first to start transmitting is guaranteed to transmit for a greater length of time than the second. This is the basis for the two mode pseudo-random number generator of the present invention: if two nodes collide when their pseudo-random number generators are synchronized, the difference in transmission times will guarantee that when the nodes finish transmitting and start their backoff, the pseudo-random number generators will be out of synchronism. Additionally, if a collision causes two nodes' pseudo-random number generators to synchronize, then the next collision will force them out of synchronism.

A special case needs to be considered. What if the two nodes start transmitting at exactly the same time? Then it might be expected that the nodes would detect the collision at the same time, jam at the same time, and stop transmitting at the same time. If the two nodes' pseudo-random number generators are in synchronism at the start of transmission, they would still be synchronized at the end of transmission. This would continue through successive transmission attempts until the maximum attempt limit is reached.

The probability of this scenario is small. First, it is very unlikely that two nodes' pseudo-random number generators would be synchronized, and that they would both request a transmission at exactly the same time.

Second, looking at the microscopic events involved with transmission and collision, it can be seen that the probability is even lower that this situation could actually allow the maximum attempt limit to be reached.

FIG. 6 represents frame transmission at a more detailed level than shown in the previous diagrams. As the drawing shows, transmissions start and end at discrete times (e.g., point 150) defined by +TXC. On the other hand, collisions occur asynchronously to +TXC (e.g., point 151), and must be synchronized for use by the backoff logic. In the drawing, +COLL is the asynchronous collision detect signal from a transceiver, and +COLL_SYNC is a version of +COLL that has been synchronized to +TXC at point 152. In response to +COLL_SYNC, the control logic will deassert TXEN in synchronism with TXC, e.g., at point 153.

+COLL is generated by analog circuitry within a transceiver, so different nodes will detect collisions and assert +COLL at different times due to physical variances in the transceiver components. Also, the +COLL synchronizers within each node will operate slightly differently, introducing more variances in the generation of +COLL_SYNC.

This variability in the generation of +COLL_SYNC will lead to variance from node to node of one or more TXC cycle times in the length of time +TXEN is asserted, even for nodes whose clocks are in phase. As described previously, variance in the assertion time of +TXEN will cause pseudo-random number generators in colliding nodes to fall out of lock-step, so the nodes will generate distinct backoff intervals and a successful transmission will occur upon the first re-try.

A preferred system, discussed above, provides a pseudo-random number which is modulated by a signal that indicates the transmissions times, such as the transmit enable signal, in network nodes. Other conditions of a node which are expected to exhibit different duty cycle behavior from node to node could also be used as a basis for modulating the pseudo-random number generator. This concept is generalized with reference to FIGS. 7-9.

FIG. 7 illustrates a system which pseudo-random number generator consists of counter 200, having a counter enable input CE and a clock input C, and supplies a pseudo-random number on line 201. The transmit clock is supplied to the clock input C across line 202. One or more local signals are supplied on line 203 to logic 204. The logic 204 also receives the transmit clock on line 202 as input. The logic 204, which may be purely combinational, generates the counter enable signal on line 205 as a function of the local signal or signals supplied on line 203 and the transmit clock signal on line 202. So long as the local signal or some combination of local signals on line 203 can be expected to exhibit different duty cycles during the relevant time periods, such as during a collision detection sequence in a CSMA/CD network, then the pseudo-random number generator of FIG. 7 can be applied to prevent look up of pseudo-random number generators in a network. As can be seen, FIG. 7 is a generalized version of the preferred system for 802.3 networks shown in FIG. 4.

Figure 8:
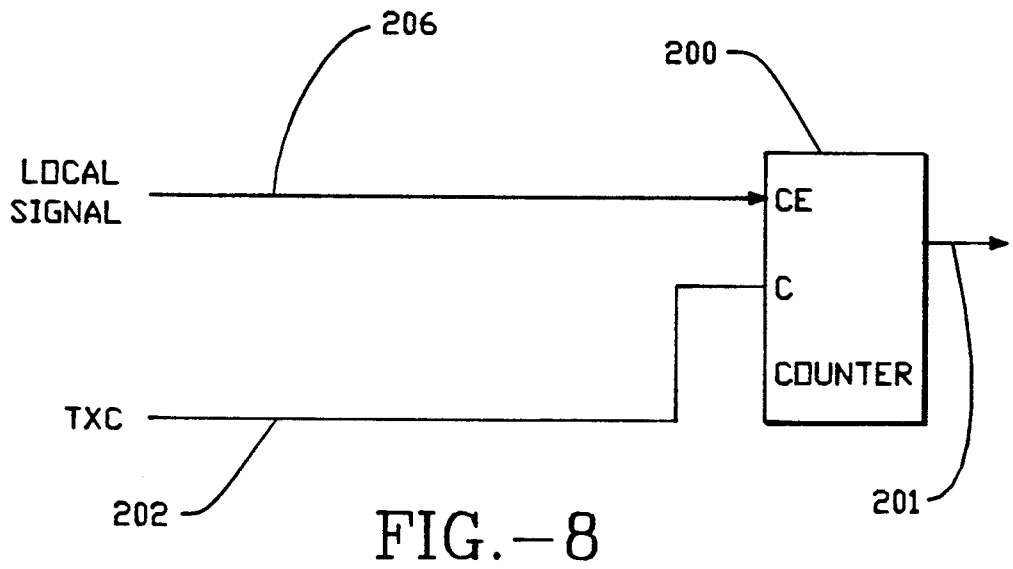

FIG. 8 illustrates a simplified embodiment. This embodiment includes the counter 200 supplying the pseudo-random number on line 201. The counter 200 receives a transmit clock on line 202 at the clock input and receives a local signal on line 206. Line 206 could be connected directly to logic generating the local signal, or to the output of a buffer connected to such logic.

This local signal should be known to exhibit different duty cycle behavior from node to node, and should change at a frequency, during relevant time periods, which is close to that of the transmit clock. If such a local signal exists, then the logic 204 modulating the counter enable signal with the transmit clock may not be necessary.

Figure 9:
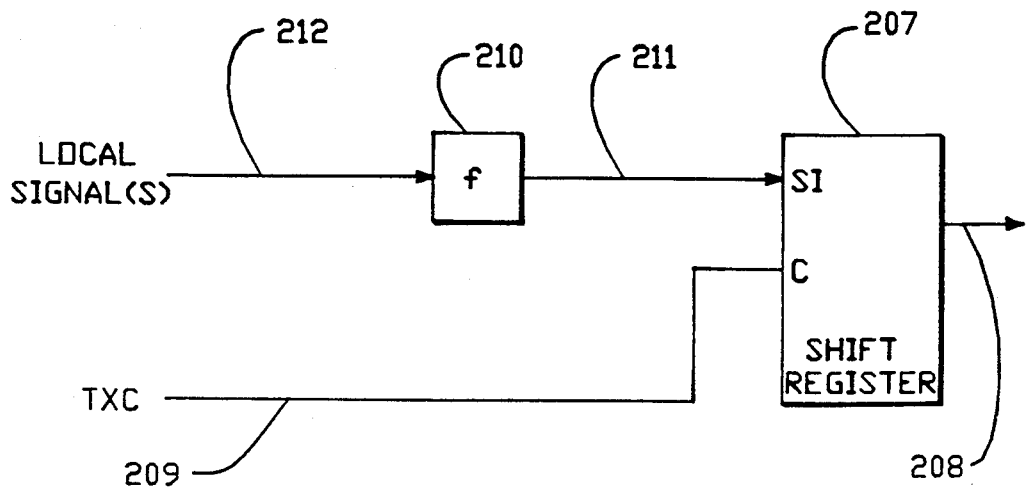

FIG. 9 illustrates yet another alternative embodiment. In this embodiment, the pseudo-random number generator consists of a shift register 207 supplying a pseudo-random number on line 208. The shift register includes a clock input C receiving the transmit clock signal on line 209 and a shift input SI. One or more local signals are supplied on line 212 to logic 210. The logic 210, which may be purely combinational, supplies the shift input signal on line 211 to the input SI of the shift register 207 as a function of the one or more local signals on line 212. The transmit clock on line 209 need not be supplied as an input to the logic 210 so long as the output of the logic 210 on line 211 changes at a rate which is comparable to the transmit clock during the periods of time that are relevant to the generation of the pseudo-random number. This can be insured by providing at least one local signal on line 211 that changes as a function of the transmit clock, or other clock that changes at a frequency similar to the transmit clock.

The shift register 207 used in the architecture of FIG. 9, can also be used in place of the counter 200 in FIGS. 7 and 8, and vice-versa. Also, other logic which generates a rapidly changing output and is controllable in a manner similar to the counter or shift register may be used.

The present invention can be beneficially applied to systems in which pseudo-random number generators are used to control access to a variety of common resources for use by a plurality of processing nodes, such as communications media, memories having a plurality of users, or other resources requiring access by large numbers of users.

No pseudo-random number generator provides a zero probability that two nodes will continually collide. The invention provided here achieves excellent performance, and is particularly useful in CSMA/CD networks. Further, the probability of continual collisions with the scheme of the present invention is extremely low.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An apparatus for generating a pseudo-random number at nodes, wherein nodes include a circuit generating a clock signal and a circuit generating a local signal expected to exhibit a different duty cycle from node to node, the apparatus comprising:

a first circuit, receiving the clock signal and a control signal, that supplies an output indicating the pseudo-random number in response to the clock signal and the control signal; and a second circuit, receiving the local signal, that supplies the control signal as a function of the duty cycle of the local signal.

2. The apparatus of claim 1, wherein the second circuit comprises a connection form the circuit generating the local signal to thereby supply the local signal as the control signal.

3. The apparatus of claim 2, wherein the connection includes a buffer.

4. The apparatus of claim 1, wherein the second circuit comprises:
logic, receiving the clock signal and the local signal, that generates the control signal as a function of the local signal and the clock signal.

5. The apparatus of claim 1, wherein the nodes further include circuits generating a plurality of local control signals including the local signal, and the first circuit includes:
logic, receiving the local signal and at least one other local control signal, that generates the control signal as a function of the local signal and the at least one other local control signal.

6. The apparatus of claim 1, wherein the first circuit includes a counter having a clock input receiving the clock signal and a counter enable input receiving the control signal.

7. The apparatus of claim 1, wherein the first circuit includes a shift register having a clock input receiving the clock signal and a shift input receiving the control signal.

8. An apparatus for generating a pseudo-random number for use in controlling access for use by a node of a common resource, comprising:
a first circuit that supplies a first signal indicating a duration of time intervals during which the common resource is in use by the node; and
a second circuit, coupled with the first circuit, for supplying a second signal indicating the pseudo-random number, the second signal normally changing according to a first algorithm and changing according to a second algorithm during intervals having lengths that are a function of the duration of time intervals indicated by the first signal.

9. The apparatus of claim 8, wherein the node includes logic generating a use signal during use of the common resource by the node, and the first circuit is responsive to the use signal.

10. The apparatus of claim 9, wherein the first circuit includes a connection from the logic to supply the use signal to the second circuit.

11. The apparatus of claim 8, wherein the second circuit comprises:
a counter, normally running at a first clock rate and running at a second clock rate intervals having lengths that are a function of the duration of time intervals indicated by the first signal.

12. The apparatus of claim 11, wherein the node includes logic generating a use signal during use of the common resource by the node, and the first circuit is responsive to the use signal.

13. The apparatus of claim 11, wherein the node further includes a clock generator providing a node clock signal, and the first and second clock rates are respective functions of the node clock signal.

14. The apparatus of claim 13, wherein:

the node includes logic generating a use signal during use of the common resource by the node, and the counter includes a clock input connected to the clock generator and an enable input receiving the first signal, and generates an output which changes in response to the node clock signal supplied to the clock input during assertion of the first signal supplied to the enable input; and the first circuit further including logic, receiving the use signal, that supplies the first signal as a function of the use signal.

15. The apparatus of claim 8, wherein the second circuit comprises:
a shift register, having a shift input and a clock input; and
a third circuit, connected to the shift input, that supplies the first signal to the shift input;
a fourth circuit, connected to the clock input, that supplies a shift clock signal to the clock input.

16. The apparatus of claim 15, wherein the node includes logic generating a use signal during use of the common resource by the node, and the first signal is a function of the use signal.

17. The apparatus of claim 15, wherein the node further includes a clock generator providing a node clock signal, and the shift clock signal is a function of the node clock signal.

18. The apparatus of claim 8, the node includes logic generating a use signal during use of the common resource by the node, and the node further includes a clock generator providing a node clock signal, and the second circuit comprises:
a shift register, having a shift input and a clock input; and
a third circuit, connected to the shift input, that supplies the first signal to the shift input in response to the use signal;
a fourth circuit, connected to the clock input, that supplies a shift clock signal in response to the node clock signal.

19. A node connected to a network medium of a communications network, comprising:
a transmitter transmitting signals on the network medium;
a collision detector detecting collisions on the network medium between signals transmitted by the node an other signals on the network medium;
a backoff control circuit, connected to the collision detector and the transmitter, that disables the transmitter upon detection of a collision for a backoff interval having a length determined by a backoff interval length signal; and
a backoff length circuit, coupled with the backoff control circuit, that supplies the backoff interval length signal, normally according to a first algorithm and according to a second algorithm during intervals that are a function of transmission times of the transmitter.

20. The node of claim 19, wherein:
the transmitter includes transmit control logic, coupled to the backoff length circuit, that asserts a transmit enable signal during transmissions by the node on the network, and deasserts the transmit enable signal during the backoff intervals; and
wherein the backoff interval length signal changes according to the second algorithm in response to the transmit enable signal.

21. The node of claim 20, wherein the backoff length circuit comprises:
- a counter, running at a first clock rate during deassertion of the transmit enable signal and running at a second clock rate during assertion of the transmit enable signal.

22. The node of claim 21, wherein the transmitter further includes a transmit clock generator providing a transmit clock signal, and the first and second clock rates are respective functions of the transmit clock signal.

23. The node of claim 21, wherein:
- the counter includes a clock input connected to the transmit clock generator and an enable input, ad generates an output which changes in response to the transmit clock signal at the clock input during assertion of a counter enable signal at the enable input; and
- further including logic, receiving the transmit enable signal, that generates the counter enable signal as a function of the transmit enable signal and the transmit clock signal.

24. The node of claim 20, wherein the backoff length circuit comprises:
- a shift register, having a shift input and a clock input; and
- a first circuit, connected to the shift input, that supplies a shift signal in response to the transmit enable signal;
- a second circuit, connected to the clock input, that supplies a shift clock signal.

25. The node of claim 24, wherein the transmitter further includes a transmit clock generator providing a transmit clock signal, and the shift clock signal is a function of the transmit clock signal.

26. The node of claim 20, the transmitter further includes a transmit clock generator providing a transmit clock signal, and wherein the backoff length circuit comprises:
- a shift register, having a shift input and a clock input; and
- a first circuit, connected to the shift input, that supplies a shift signal in response to the transmit enable signal and the transmit clock signal;
- a second circuit, connected to the clock input, that supplies a shift clock signal in response to the transmit clock signal.

27. An apparatus providing an interface between a data processor and a communication medium for a CSMA/CD network, comprising:
- a transmitter, responsive to a transmit enable signal and a transmit clock signal, for transmitting signals on the communications medium;
- a collision detector generating a collision signal in response to collisions on the communications medium between the transmitter and other sources of signals on the communications medium;
- control logic, receiving requests to transmit frames of data from the data processor and receiving the collision signal, that generates the transmit enable signal, wherein the transmit enable signal is deasserted in response to the collision signal for a backoff interval having a length determined by a pseudo-random signal; and
- a circuit, coupled with the control logic and responsive to the transmit clock signal, that generates the pseudo-random signal determinant of the backoff interval, the pseudo-random signal normally changing according to a first algorithm and changing according to a second algorithm during intervals that are a function of transmission times of the transmitter.

28. The apparatus of claim 27, wherein the pseudo-random changes according to the second algorithm in response to the transmit enable signal.

29. The apparatus of claim 27, wherein the circuit that generates the pseudo-random signal comprises:
- a counter, running at a first clock rate during deassertion of the transmit enable signal and running at a second clock rate during assertion of the transmit enable signal.

30. The apparatus of claim 29, wherein the transmit clock runs at the first clock rate, and the second clock rate equals essentially the first clock rate divided by a constant other than one.

31. The apparatus of claim 29, wherein the first and second clock rates are respective functions of the transmit clock signal.

32. The apparatus of claim 29, wherein:
- the counter includes a clock input receiving to the transmit clock signal and an enable input, and generates an output which changes in response to the transmit clock signal during assertion of a counter enable signal at the enable input; and
- further including logic, receiving the transmit enable signal, that supplies the counter enable signal as a function of the transmit enable signal and the transmit clock signal.

33. The apparatus of claim 27, wherein the circuit that generates the pseudo-random signal comprises:
- a shift register, having a shift input and a clock input; and
- a first circuit, connected to the shift input, that supplies a shift signal in response to the transmit enable signal;
- a second circuit, connected to the clock input, that supplies a shift clock signal.

34. The apparatus of claim 27, wherein the circuit that generates the pseudo-random signal comprises:
- a shift register, having a shift input and a clock input; and
- a first circuit, connected to the shift input, that supplies a shift signal in response to the transmit enable signal and the transmit clock signal;
- a second circuit, connected to the clock input, that supplies a shift clock signal in response to the transmit clock signal.

* * * * *